US008117032B2

(12) United States Patent
Charoenruengkit et al.

(10) Patent No.: US 8,117,032 B2
(45) Date of Patent: Feb. 14, 2012

(54) NOISE PLAYBACK ENHANCEMENT OF PRERECORDED AUDIO FOR SPEECH RECOGNITION OPERATIONS

(75) Inventors: Werayuth T. Charoenruengkit, Delray Beach, FL (US); Gary R. Hanson, Boynton Beach, FL (US); Jon Palgon, Boynton Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 1124 days.

(21) Appl. No.: 11/269,921

(22) Filed: Nov. 9, 2005

(65) Prior Publication Data

US 2007/0106507 A1    May 10, 2007

(51) Int. Cl.
*G10L 17/00* (2006.01)
*G10L 15/20* (2006.01)
*G10L 21/00* (2006.01)

(52) U.S. Cl. .................... 704/248; 704/233; 704/270
(58) Field of Classification Search .................. 704/203, 704/233, 241, E11.005, 270
See application file for complete search history.

(56) References Cited

U.S. PATENT DOCUMENTS

| | | | | |
|---|---|---|---|---|
| 4,550,425 A | * | 10/1985 | Andersen et al. | 704/212 |
| RE32,172 E | | 6/1986 | Johnston et al. | |
| 4,610,023 A | * | 9/1986 | Noso et al. | 704/233 |
| 4,811,399 A | * | 3/1989 | Landell et al. | 704/253 |
| 4,829,578 A | | 5/1989 | Roberts | |
| 4,866,778 A | * | 9/1989 | Baker | 704/254 |
| 4,893,197 A | * | 1/1990 | Howells et al. | 360/8 |
| 5,799,065 A | * | 8/1998 | Junqua et al. | 379/88.03 |
| 5,826,230 A | | 10/1998 | Reaves | |
| 6,078,884 A | | 6/2000 | Downey | |
| 6,505,153 B1 | * | 1/2003 | Van Thong et al. | 704/211 |
| 6,574,601 B1 | | 6/2003 | Brown et al. | |
| 2002/0069052 A1 | | 6/2002 | Chen | |
| 2002/0152076 A1 | * | 10/2002 | Kahn et al. | 704/270 |
| 2004/0064314 A1 | * | 4/2004 | Aubert et al. | 704/233 |
| 2005/0049863 A1 | | 3/2005 | Gong et al. | |
| 2005/0192800 A1 | | 9/2005 | Thyssen | |
| 2005/0227657 A1 | * | 10/2005 | Frankkila et al. | 455/255 |

* cited by examiner

*Primary Examiner* — Richemond Dorvil
*Assistant Examiner* — Olujimi Adesanya
(74) *Attorney, Agent, or Firm* — Wolf, Greenfield & Sacks, P.C.

(57) ABSTRACT

A speech processing method including the step of identifying prerecorded audio comprising an original speech segment and a corresponding original noise segment. An audio stream can be generated from the prerecorded audio. The audio stream can comprise a stream speech segment and a stream noise segment. The stream speech segment can have approximately a same duration as the original speech segment. The stream noise segment can have a longer duration than the original noise segment. The audio stream can be conveyed to a speech recognition engine. The speech recognition engine can automatically determine an end of utterance condition based upon the stream noise segment. The original noise segment can be of insufficient duration for the speech recognition engine to determine the end of utterance condition. Responsive to the determining of the end of utterance condition, the stream speech segment can be speech recognized.

17 Claims, 3 Drawing Sheets

NOISE PLAYBACK ENHANCEMENT OF PRERECORDED AUDIO FOR SPEECH RECOGNITION OPERATIONS

BACKGROUND

1. Field of the Invention

The present invention relates to the field of speech processing and, more particularly, to a noise playback enhancement of prerecorded audio for speech recognition operations.

2. Description of the Related Art

Speech recognition engines convert audio containing speech into textual equivalents of the speech. Accuracy in performing the speech-to-text conversions is crucial to success of a speech recognition engine. Accuracy of a speech recognition engine is typically evaluated by feeding prerecorded audio into a speech recognition engine.

Behavior of a speech recognition engine when fed the prerecorded audio can depend upon a listening mode of the engine. Common listening modes include a push-to-talk mode, a push-to-activate mode, and an always-listening mode. In a push-to-talk mode, a user explicitly notifies a speech recognition engine when to start and stop listening to speech. Speech provided between the "start" and "stop" points is speech-to-text converted, while other speech is ignored by the speech recognition engine. In a push-to-activate mode, a user notifies a speech recognition engine when to start listening to speech, but the speech recognition engine is responsible for detecting the end of speech. In an always-listening mode, a speech recognition engine is responsible for automatically detecting when to start listening and when to stop listening to speech.

A speech recognition engine operating in a push-to-activate or an always-listening mode typically relies upon some amount of nonspeech audio, referred to as "noise," to detect the end of speech or the end of an utterance. The amount of "noise" that must follow an utterance in order for an end of utterance detection to occur is not deterministic.

When testing, measuring or training a speech recognition engine, audio streams containing leading and trailing noise suitable for each mode must be used. The reason is that when a trailing noise segment is insufficiently long to generate an end of utterance event, a corresponding speech utterance is not properly handled. Thus, a speech recognition engine in a push-to-activate or an always-listening mode is unable to be accurately tested/measured/trained using prerecorded audio that includes an insufficient amount of trailing "noise" after each speech utterance.

To ensure accurate and repeatable results, pre-recorded audio files are typically used. Unfortunately, the costs in obtaining, storing and utilizing audio recordings for the purposes of testing, measuring or training a speech recognition engine can be directly proportional to a length of the recordings. Prerecorded audio containing utterances and corresponding trailing "noise" segments that are sufficiently long for one mode may be unnecessarily long for another, and can result in needless delays when transferring the audio streams to and from the devices under test. These delays may be significant when tens of thousands of audio files are used. On the other hand, tailoring prerecorded audio streams for each mode significantly increases storage requirements since each tailored file, except for the leading and trailing noise, is basically a duplicate.

One conventional solution to the above problem is to record and store a "noise" recording for each speech recording, where the noise recording is of sufficient length for any speech recognition engine to detect an end of utterance. This solution is disfavored as it is expensive to produce and store a noise recording having a "safe" duration for each speech recording. Consequently, most prerecorded audio used for speech recognition engines includes a minimal amount of "noise."

Another conventional solution is to alternatively send two different audio feeds to a speech recognition engine. The first feed containing prerecorded speech utterances with minimal noise between utterances and the second feed containing pure "noise." Notably, the first audio feed can be formed using one or more audio files, each file containing at least one utterance.

A first speech utterance from the first feed is played to the speech recognition engine, then the first feed is paused and the second feed is started. The second feed, or noise feed, is played until either an end of utterance event or a time-out event occurs. Then the second feed is stopped and the first feed is played for the second speech utterance. The process repeats with the same "noise" feed being used for each utterance.

Tests/measurements/training based upon a single "noise" feed does not provide realistic results in all cases, as speech recognition engines used in real world environments must handle many different types of noise. Additionally, this solution can require all prerecorded speech utterances to be normalized to the same level as the noise recording. Normalizing the utterances can be expensive and can also introduce errors that decrease result reliability.

SUMMARY OF THE INVENTION

The present invention discloses a method and system for enhancing noise segments within prerecorded audio to ensure that sufficient noise exists for a speech engine to automatically detect that utterances have ended. The invention assumes that prerecorded audio includes one or more speech utterances or speech segments, each speech segment having a corresponding "noise" segment. After the speech utterance is played or fed into the speech recognition engine, the corresponding noise segment can be repeatedly fed into the engine until either an end of utterance event or a time-out event occurs.

This solution provides the benefit of limiting an amount of storage space needed for prerecorded audio, as the "noise" segment need not be of sufficient duration to ensure that the speech engine is able to detect an end of utterance or a time-out condition on a single play of the noise segment. Additionally, the solution does not require that all audio recordings be normalized to a single "noise" recording, as does a common conventional technique. Finally, the present solution provides realistic results in that multiple different types of "noise" are presented to a speech recognition engine. Specifically, the noise being fed to the speech recognition engine for an utterance is noise built into prerecorded audio when the utterance was recorded.

The present invention can be implemented in accordance with numerous aspects consistent with material presented herein. For example, one aspect of the present invention can include a speech processing method including the step of identifying prerecorded audio comprising an original speech segment and a corresponding original noise segment. An audio stream can be generated from the prerecorded audio. The audio stream can comprise a stream speech segment and a stream noise segment. The stream speech segment can have approximately a same duration as the original speech segment. The stream noise segment can have a longer duration than the original noise segment. The audio stream can be conveyed to a speech recognition engine. The speech recognition engine can automatically determine an end of utterance condition based upon the stream noise segment. This is true even though the original noise segment can be of insufficient duration for the speech recognition engine to determine the end of utterance condition. Responsive to the determining of the end of utterance condition, the stream speech segment can be speech recognized.

Yet another aspect of the present invention can include a speech processing method comprising the step of identifying prerecorded audio comprising a speech segment and a corresponding noise segment. The speech segment can be presented. After presenting the speech segment, the noise segment can be presented. At least a portion of the noise segment can be re-presented. An end of utterance can be automatically detected responsive to the step of presenting the noise segment and the re-presenting step. The speech segment can be speech recognized.

Accordingly by utilizing this method, a speech recognition engine can receive the speech segment followed by the noise segment followed by at least one iteration of at least one portion of the noise segment. The speech engine can use the noise segment and additional portions thereof to determine an end of utterance condition. The speech engine can thereafter speech recognize the speech segment.

Still another aspect of the present invention can include an audio stream that is sent to a speech recognition engine. The audio stream can be generated from an original audio stream comprising an original speech segment and a corresponding original noise segment. The audio stream can include a stream speech segment and a stream noise segment. The stream speech segment can be approximately identical to the original speech segment. The stream noise segment can be generated from the original noise segment, but can have a longer duration than the original noise segment. The speech recognition engine can use the stream noise segment to determine an end of utterance condition. The speech recognition engine speech can recognize the audio stream speech segment after the end of utterance condition is detected. The original noise segment can be of insufficient duration for the speech recognition engine to determine the end of utterance condition.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
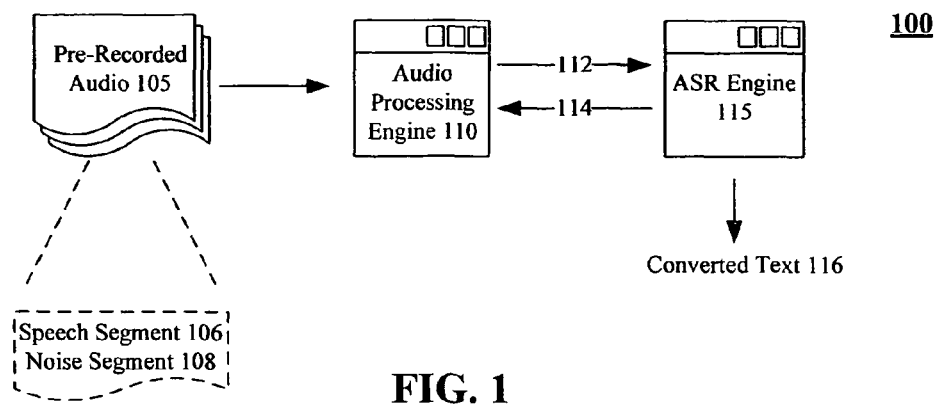
FIG. 1 is a schematic diagram of a system for processing speech with a noise enhancement in accordance with an embodiment of the inventive arrangements disclosed herein.

FIG. 1 is a schematic diagram of a system 100 for processing speech with a noise enhancement in accordance with an embodiment of the inventive arrangements disclosed herein. The noise enhancement can be beneficial in many speech processing situations that utilize prerecorded audio. For example, prerecorded audio is often used to test or to measure the recognition accuracy of a speech recognition engine or speech recognition application. Prerecorded audio is also used to train configurable parameters of some speech recognition engines. In each of these speech processing situations, the speech engine being fed prerecorded audio can automatically detect the end of each utterance based at least in part upon "noise" which follows each utterance.

The noise enhancement described herein can alleviate the common problem where prerecorded audio fed into a speech engine contains insufficiently long noise segments. Insufficiently long noise segments exist within prerecorded audio when at least a portion of the noise segments contained in the prerecorded audio are not of sufficient duration for the speech engine to automatically detect that an utterance has ended.

In system 100, prerecorded audio 105 can be processed by an audio processing engine 110 to generate processed audio 112 that is conveyed to an automatic speech recognition (ASR) engine 115. The ASR engine 115 can generate converted text 116 from the processed audio 112.

The prerecorded audio 105 can be contained within one or more discrete storage units, such as one or more computer readable files. Each prerecorded audio 105 unit can include at least one speech segment 106 and at least one corresponding noise segment 108. The speech segment 106 can contain a speech utterance that is to be recognized by the automatic speech recognition engine 115.

The noise segment 108 can include audio that does not contain speech that is to be recognized by the ASR engine 115. The noise segment 108 can include silence and/or ambient noise that are recorded before and after speech segment 106 is recorded. That is, noise segment 108 can represent the period of relative silence that is recorded when a speaker is preparing to speak an utterance or when a speaker has already spoken the utterance. Speech segment 106 and noise segment 108 will typically be recorded in a continuous fashion and will be recorded within the same relative audio environment.

It should be appreciated that multiple speech segments 106 and noise segments 108 can be stored upon a single medium containing prerecorded audio. For example, an audio tape can sequentially store multiple speech segments 106, where each speech segment 106 can be immediately followed with a noise segment 108. Prerecorded audio 105 can be stored using any of a variety of mediums including, but not limited to, a hard drive space, an audio tape, a compact disk (CD), a digital video disk (DVD), a flash drive, read-only memory (RAM), and the like.

It should also be appreciated that prerecorded audio 105 will typically be stored in a digital format. Nonetheless, the invention can be used when the prerecorded audio 105 is originally stored in an analog format. In one embodiment, the audio processing engine 110 can initially perform an analog to digital conversion of prerecorded audio 105 stored in an analog format and can subsequently handle the digitally converted audio in the same manner that prerecorded audio 105 which was originally in a digital format is handled.

Audio processing engine 110 can process the prerecorded audio 106 to generate processed audio 112, which is fed or sent to the ASR engine 115. The audio processing engine 110 is configured to extend or enhance the noise segment 108 so that processed audio 112 can include a longer noise segment than that contained within the prerecorded audio 105. The duration of the speech segment 108 included within the processed audio 112 can remain approximately unchanged.

The noise segment 108 is extended to ensure that it is of sufficient duration for the ASR engine 115 to determine an end of utterance, presuming that the ASR engine 115 is configured for a listening mode where an end of an utterance must be automatically detected. Listening modes requiring automatic end of utterance detection include a push-to-activate listening mode and an always-on listening mode.

The noise segment 108 can be extended in a variety of manners. In one embodiment, the noise segment 108 or a portion thereof can be looped or continuously repeated, thereby extending the duration of the noise segment 108. When the noise segment 108 is repeated, the boundaries between noise segment 108 repetitions can be smoothed to prevent a boundary disjoint from being misinterpreted as a speech utterance. Numerous smoothing or filtering techniques known in the art can be used. For example, interpolation and zero-crossing techniques can be applied so as not to introduce an anomaly that the ASR engine 115 might misinterpret.

Other means of extending the noise segment 108 are contemplated herein, and the invention is not to be construed as limited to embodiments that rely upon repetition. For example, the playback rate of the noise segment 108 can be decreased relative to the rate of playback of the speech segment 106, thereby resulting in processed audio 112 having an increased noise segment 108 duration.

In one embodiment, audio processing engine 110 can perform additional audio processing functions using known digital signal processing (DSP) techniques. The audio processing functions can be designed to produce processed audio 112 that simulates real-world conditions in which the ASR engine 115 is to operate. For example, the audio processing engine 110 can filter out undesired ambient noise contained within the prerecorded audio 105. An undesired ambient noise can include "start" and "cut-off" noises associated with a recording device. These undesired noises can be present within prerecorded audio 105, but will not be present within input obtained from a real-world operational environment.

In another example, audio processing engine 110 can incorporate additional ambient noise and/or amplify existing ambient noise contained within the prerecorded audio 105. For example, the prerecorded audio 105 can be recorded in a sound room having little ambient noise, even though the ASR engine 115 is likely to receive audio generated in audio environments having a significant amount of ambient noise.

It should be appreciated that few additional DSP operations will typically be required of the audio processing engine 110 when the prerecorded audio 105 is recorded within a representative audio environment. That is, since both the speech segment 106 and associated the noise segment 108 are both recorded at the same relative time in the same relative environment, the audio processing engine 110 should not need to normalize the speech segment 106 relative to the noise segment 108. Such a normalization technique is an error inducing technique that is required when conventional solutions are utilized as described in the background section.

The ASR engine 115 can include software/hardware/firmware components and/or routines configured to convert speech utterances into their textual equivalents. Specifically, the ASR engine 115 can convert processed audio 112 into converted text 116.

The ASR engine 115 can automatically detect an end of an utterance based upon noise following an utterance. This detection can trigger an end of utterance event, which causes the ASR engine 115 to speech-to-text convert the speech segment 106. If no end of utterance is detected after a designed time-out period, the ASR engine 115 can trigger a time-out event, which can terminate recognition operations.

When either an end of utterance event or a time-out event is triggered, termination indicator 114 can be conveyed to and/or be otherwise detected by the audio processing engine 110. Upon receiving the termination indicator 114, the audio processing engine 110 can automatically stop processes designed to extend the noise segment 108. For example, the audio processing engine 10 can stop repeating the noise segment 108 and can automatically retrieve a different speech segment (having a different associated noise segment), which can be fed to the ASR engine 115 via processed audio 112 stream.

It should be appreciated that the processed audio 112 can be customized for different contemplated situations and for different expected input of the ASR engine 115. For example, it is common for an ASR engine 115 to receive a stream of digitally encoded audio data. The processed audio 112 can therefore be a stream of data provided to the ASR engine 115 a frame at a time.

If ASR engine 115 includes multiple listening modes, different audio processes can be performed by the audio processing engine 110 depending upon the listening mode. For example, if the ASR engine 115 includes push-to-talk and a push-to-activate modes, the noise segment can be extended when the ASR engine 115 is in the push-to-active mode and can be unmodified (not extended) when the push-to-talk mode is active.

Figure 2:
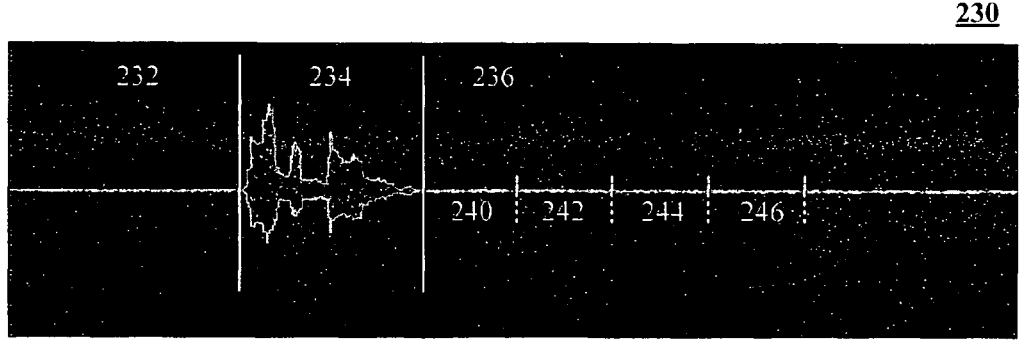
FIG. 2 illustrates two prerecorded audio files, each containing a speech segment and a noise segment in accordance with an embodiment of the illustrative arrangements disclosed herein.

FIG. 2 illustrates two prerecorded audio files (file 210 and file 230), each containing a speech segment and a noise segment. The second audio file is a modified version of the first audio file that has been modified to increase the duration of the noise segment in accordance with an embodiment of the illustrative arrangements disclosed herein. File 210 can represent one example of prerecorded audio 105 and file 230 can represent one example of processed audio 112.

Audio file 210 includes preceding noise segment 212, followed by speech segment 214, followed by trailing noise segment 216. Both preceding noise segment 212 and trailing noise segment 216 are periods of relative silence compared to speech segment 214.

In audio file 230, preceding noise segment 232 is approximately identical to preceding noise segment 212. Speech segment 234 is approximately identical to speech segment 214. As used herein, approximately identical audio segments can be segments that have been directly copied from an original segment without any significant modifications being made. Hence, segment 232 is a copy of segment 212 and segment 234 is a copy of segment 214. Additionally, approximately identical audio segments can be processed and/or modified in a manner that is not related to problems solved by the present invention and still be considered approximately identical for purposes detailed herein.

Trailing noise segment 236 has been generated from trailing noise segment 216, where trailing noise segment 216 has been repeated multiple times. Accordingly, noise segment 236 comprises segment 240, segment 242, segment 244, and segment 246. Segment 240 is a first iteration of trailing noise segment 216. Segment 242 is a second iteration of noise segment 216; segment 244 a third iteration; and, segment 246 a fourth iteration. It is assumed for purposes of FIG. 2 that by the time the forth iteration of trailing noise segment 216 was presented or fed into a speech recognition engine that either an end of utterance event or a time out event has occurred.

It should be appreciated that audio files 210 and 230 are provided for illustrative purposes only and the invention is not to be interpreted as limited to the depicted audio files. Other embodiments and arrangements are contemplated herein. For example, it is contemplated that noise segment 236 can be constructed from proceeding noise segment 212 instead of from trailing noise segment 216. It is also contemplated that only a portion of trailing noise segment 216 can be used and continuously repeated to construct trailing noise segment 236. It is further contemplated that trailing noise segment 236 can be constructed by reducing the rate at which noise segment 216 is presented, thereby extending the duration of trailing noise segment 236 relative to the duration of trailing noise segment 216. Generally, it is contemplated that training noise segment 236 can be constructed from segments 212 and/or 216 in any fashion, such that trailing noise segment 236 has a longer duration than trailing noise segment 216.

Figure 3:
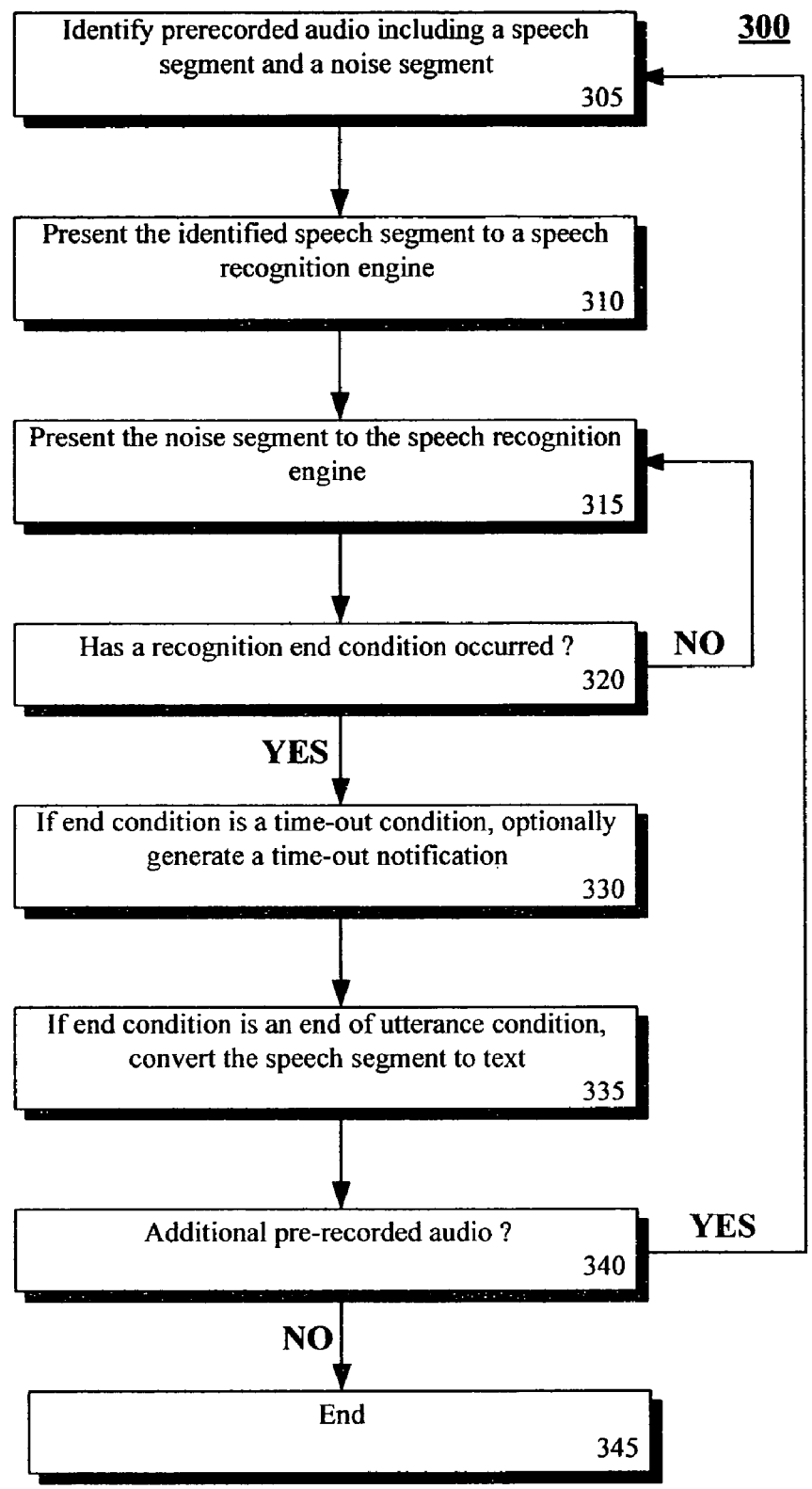
FIG. 3 is a flow chart of a method for extending a trailing noise segment of prerecorded audio in accordance with an embodiment of the inventive arrangements disclosed herein.

FIG. 3 is a flow chart of a method 300 for extending a trailing noise segment of prerecorded audio in accordance with an embodiment of the inventive arrangements disclosed herein. Method 300 can be performed in the context of system 100 or in the context of any other system where prerecorded audio containing both a speech utterance and a corresponding noise segment is presented to a speech engine.

Method 300 can begin in step 305, where prerecorded audio that includes a speech segment and a corresponding noise segment can be identified. In step 310, the speech segment can be presented to a speech recognition engine. Presenting the speech segment can include playing the speech segment and sending the resulting audio to the speech recognition engine; digitally copying the speech segment and sending the copy to the speech recognition engine; digitally processing the speech segment and sending a processed result approximately equivalent to the original speech segment to the speech recognition engine; generating an audio stream from the speech segment and conveying the audio stream to the speech recognition engine; and other such methods for presenting the speech segment to the speech recognition engine.

In step 315, the noise segment can be presented to the speech recognition engine. In step 320, a determination can be made as to whether a recognition end condition has occurred. A recognition end condition can include an end of utterance detection and/or an occurrence of a time-out event. If no end condition has occurred, the method can loop from step 320 to step 315.

It should be understood that this loop is intended to extend the noise segment and that the entire original noise segment of step 315 need not be re-presented in its entirety. Instead, a portion of the noise segment can be presented in the second iteration of step 315. Additionally, in one contemplated embodiment, a smoothing/filtering technique can be applied to prevent anomalies when the audio transitions from step 320 to step 315.

It should also be understood that although a loop and a repetition of the noise segment is illustrated in method 300, other techniques for extending the noise segment are contemplated herein and the method should not be construed as limited in this regard.

In step 330, if the end condition resulted from a time out condition, an optional notification of the end condition can be generated. The method can then jump from step 330 to step 340. In step 335, if the end condition resulted from an end of utterance condition, the speech segment can be converted from speech to text. In step 340, the method can determine whether additional prerecorded audio is to be processed. If so, the method can loop to step 305. Otherwise, the method can end in step 345.

Figure 4:
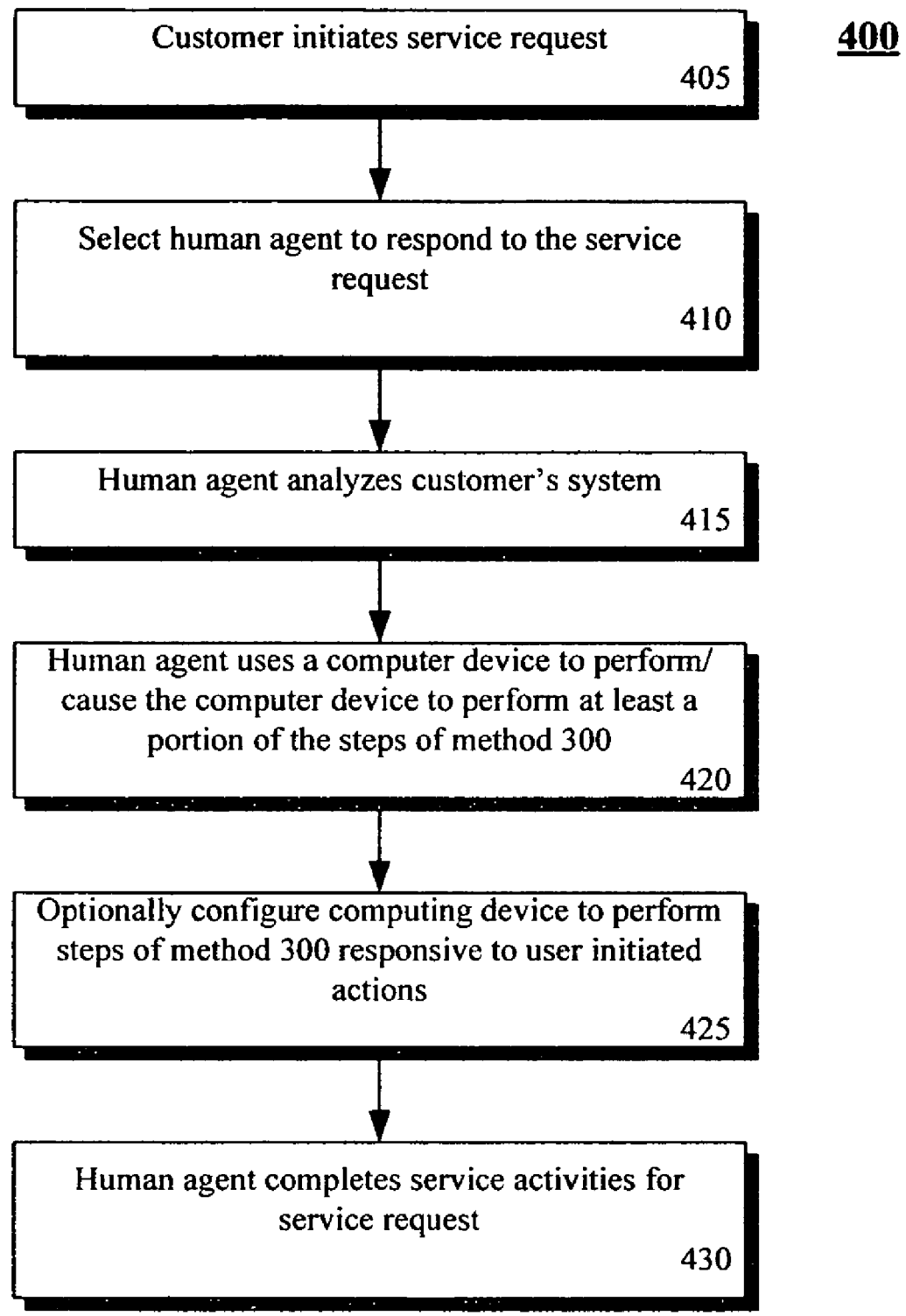
FIG. 4 is a flow chart of a method showing a manner in which a service agent can configure a speech recognition system having a noise playback enhancement in accordance with an embodiment of the illustrative arrangements disclosed herein.

FIG. 4 is a flow chart of a method 400 showing a manner in which a service agent can configure a speech recognition system having a noise playback enhancement in accordance with an embodiment of the illustrative arrangements disclosed herein. In method 400, the service agent can configure system 100 for a customer in response to a service request so that the system is capable of performing method 300.

Method 400 can begin in step 405, when a customer initiates a service request. The service request can be a request to add a noise playback enhancement to a speech recognition service used by the customer and/or to a speech recognition engine owned by the customer. The service request need not be a request to specifically test a speech recognition system for accuracy, but the request can be any request that results in such a test occurring.

For example, a customer can subscribe for a new WEBSPHERE speech recognition service. Responsive to the request, a service agent can configure the WEBSHERE service, can optimize the service for the customer's needs, and can activate the speech recognition service for the customer. The service agent can further measure the accuracy of the optimized service and provide the customer with a summarized report of the measurements. In measuring the accuracy of the optimized service, pre-recorded audio can be fed into a WEBSHERE speech recognition engine that provides the recognition service. The trailing noise segments within the pre-recorded audio can be enhanced in the manner detailed in method 300 during this process.

In another example, a customer can submit a request to have a service agent modify a customer owned system having speech recognition capabilities. For instance, a service contract for maintaining, troubleshooting, and/or upgrading a customer owned system can exist between a service agency responding to service requests and the customer. In the example, the service request can be a request to optimize and train the customer's system so that both a push-to-activate mode and an always-listening mode of the system are at least 95 percent accurate. In response to the request, a service agent can configure parameters of the customer's system, can train the system, and can test the trained system to determine recognition accuracy. Different training and testing steps will have to be performed for each listening mode. Steps of method 300 can be performed by the service agent during the training and/or testing stages.

In step 410, after a service request has been received, a human agent can be selected to respond to the service request. In step 415, the human agent can analyze a customer's speech processing needs, equipment, and configuration. In step 420, the human agent can use one or more computing devices to perform or to cause one or more of the computing devices to perform the steps of method 300. Many different situations exist where a service agent will be required to test, measure, and/or train a speech recognition system. Step 420 can be performed in any and all of these situations, which can result in more accurate and more efficient testing and/or training of the speech recognition system.

Appreciably, the one or more computing devices used by the human agent can include the customer's computer, a mobile computing device used by the human agent, a networked computing device, and combinations thereof. For example, the service agent can connect a mobile computer to a client's on-site speech-recognition system and test and/or train the speech recognition system using the mobile computer.

In another situation, the human agent can make adjustments to a middleware application server, such as WEBSPHERE application server, and/or to a client operated management information system (MIS) that utilizes a WEBSPHERE application server. For example, the human agent can load and configure a speech recognition application within a WEBSHERE application server and can adjust interface parameters of a customer's computer system to interact with the application server. Then the human agent can use steps of method 300 to test the accuracy of the customer's computer system that relies upon WEBSPHERE components to perform one or more speech recognition tasks.

In optional step 425, the human agent can configure the customer's computer in a manner that the customer or clients of the customer can perform one or more steps of method 300 in the future. For example, the agent can configure a management interface used by a customer so that a customer can test the recognition accuracy of a speech-enabled system. For instance a GUI option for testing can be configured, which upon selection automatically performs one or more of the steps described in method 300. In step 430, the human agent can complete the service activities for which the service request was submitted.

It should be noted that while the human agent may physically travel to a location local to adjust the customer's computer or application server, physical travel may be unnecessary. For example, the human agent can use a remote agent to remotely manipulate the customer's computer system and/or an application server.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A speech processing method comprising:
identifying prerecorded audio comprising an original speech segment and a corresponding original noise segment;
generating an audio stream from said prerecorded audio, said audio stream comprising a stream speech segment and a stream noise segment, wherein said stream speech segment is substantially equal to the original speech segment and has approximately a same duration as the original speech segment, and wherein said stream noise segment has a longer duration than the original noise segment;
conveying said audio stream to a speech recognition engine;
said speech recognition engine automatically determining an end of utterance condition based upon said stream noise segment, wherein said stream noise segment is generated by repeating the original noise segment one or more times such that said stream noise segment duration is increased until said speech recognition engine indicates recognition of the end of utterance and, in response to said speech recognition engine indicating recognition of the end of utterance, said stream noise segment is automatically terminated and the original noise segment is no longer repeated, wherein the stream noise segment duration depends on said speech recognition engine indicating recognition of the end of utterance; and
responsive to determining an end of utterance condition, speech recognizing said stream speech segment.

2. The method of claim 1, wherein said original noise segment is of insufficient duration for the speech recognition engine to determine the end of utterance condition.

3. The method of claim 1, wherein said stream noise segment is generated by repeating at least a portion of said original noise segment a plurality of times.

4. The method of claim 1, wherein said original noise segment immediately follows and is continuous with said original speech segment, and wherein said stream noise segment immediately follows and is continuous with said stream speech segment.

5. A speech processing method comprising:
identifying, at an audio processing engine, prerecorded audio stored in a recording medium, and comprising a speech segment and a corresponding noise segment;
presenting the speech segment to an automatic speech recognition engine by the audio processing engine;
after presenting the speech segment, presenting the noise segment to the automatic speech recognition engine by the audio processing engine;
re-presenting at least a portion of the noise segment to the automatic speech recognition engine by the audio processing engine;
automatically detecting an end of utterance at the automatic speech recognition engine responsive to presenting the noise segment and re-presenting at least a portion of the noise segment to form a stream noise segment, wherein said re-presenting is repeated by the audio processing engine one or more times until an occurrence of at least one of a time-out event and an end of utterance event is indicated by the automatic speech recognition engine and, in response to indication of at least one of a time-out event and an end of utterance event by the automatic speech recognition engine, said re-presenting is automatically terminated by the audio processing engine and the noise segment is no longer re-presented, wherein a duration of the stream noise segment depends on the occurrence of at least one of a time-out event and an end of utterance event; and speech recognizing the speech segment by the automatic speech recognition engine.

6. The method of claim 5, further comprising:

after the presenting of the noise segment, determining a non-occurrence of an end of utterance event associated with the speech segment; and responsive to the determining step, continuously repeating the re-presenting step until an occurrence of at least one of a time-out event and an end of utterance event.

7. The method of claim 5, wherein said noise segment follows said speech segment as part of a continuous audio recording.

8. The method of claim 5, wherein the step of presenting the speech segment, the step of presenting the noise segment, and the re-presenting step each send a stream of audio to a speech recognition engine, wherein said speech recognition engine performs said speech recognizing step.

9. The method of claim 8, wherein the steps of claim 5 are steps performed to test said speech recognition engine.

10. The method of claim 8, wherein the steps of claim 5 are steps performed to measure an accuracy of said speech recognition engine.

11. The method of claim 8, wherein the steps of claim 5, are steps performed to train said speech recognition engine.

12. The method of claim 8, wherein said stream of audio is segmented into a plurality of frames, and wherein said frames are presented to said speech recognition engine a frame at a time.

13. The method of claim 5, said method further comprising:

applying at least one of a smoothing and a filtering algorithm to smooth a transition selected from a group of transitions comprising of a transition between said noise segment of the presenting step and said at least a portion of the noise segment of the re-presenting step and a transition between said at least a portion of the noise segment of the re-presenting step and a different said at least a portion of the noise segment associated with a repeated iteration of the re-presenting step.

14. The method of claim 5, further comprising:

identifying prerecorded audio comprising a second speech segment and a second corresponding noise segment;

after the step of presenting the speech segment, the step of presenting the noise segment, and the re-presenting step, presenting the second speech segment;

after presenting the second speech segment, presenting the second noise segment;

re-presenting at least a portion of the second noise segment;

automatically detecting an end of utterance associated with the second speech segment responsive to the step of presenting the second noise segment and the step of re-presenting the second noise segment; and speech recognizing the second speech segment.

15. The method of claim 5, wherein the steps of claim 5 are performed by at least one of a service agent and a computing device manipulated by the service agent, the steps being performed in response to a service request.

16. The method of claim 5, wherein said steps of claim 5 are performed by at least one machine in accordance with at least one computer program having a plurality of code sections that are executable by the at least one machine.

17. A non-transitory computer-readable storage medium encoded with instructions that, when executed by an audio processing engine, perform a speech processing method comprising:

identifying prerecorded audio comprising an original speech segment and a corresponding original noise segment;

generating an audio stream from said prerecorded audio, said audio stream comprising a stream speech segment and a stream noise segment, wherein said stream speech segment is substantially equal to the original speech segment and has approximately a same duration as the original speech segment, and wherein said stream noise segment has a longer duration than the original noise segment;

conveying said audio stream to a speech recognition engine;

said speech recognition engine automatically determining an end of utterance condition based upon said stream noise segment, wherein said stream noise segment is generated by repeating the original noise segment one or more times such that said stream noise segment duration is increased until said speech recognition engine indicates recognition of the end of utterance and, in response to said speech recognition engine indicating recognition of the end of utterance, said stream noise segment is automatically terminated and the original noise segment is no longer repeated, wherein the stream noise segment duration depends on said speech recognition engine indicating recognition of the end of utterance; and responsive to determining an end of utterance condition, speech recognizing said stream speech segment.

\* \* \* \* \*